(No Model.)
G. W. DEARBORN.
SEAT FOR COUNTERS.
No. 571,651. Patented Nov. 17, 1896.
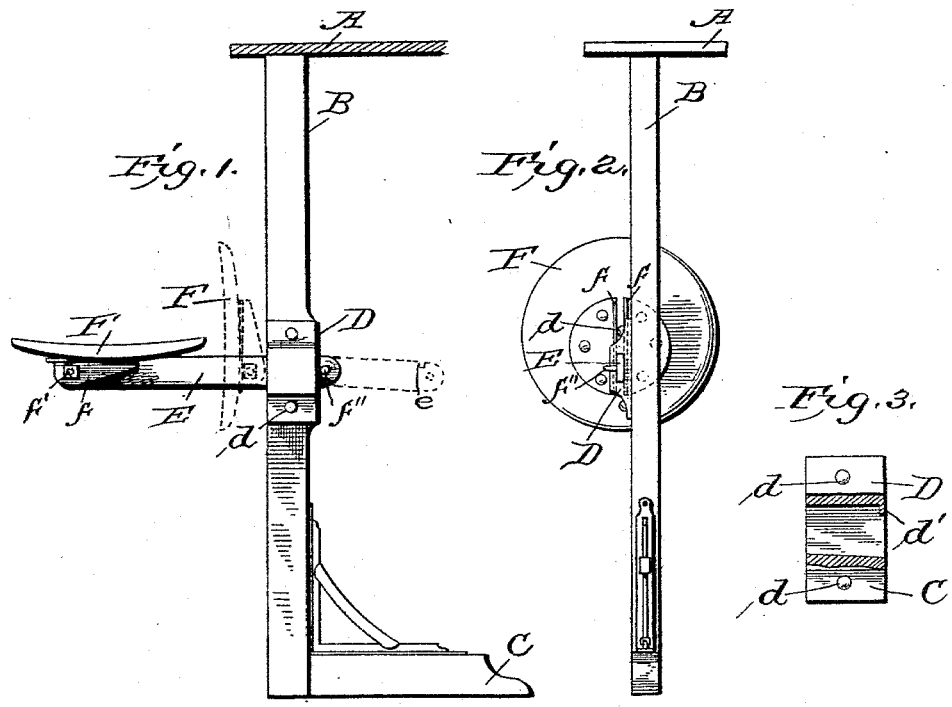
Attest
F. L. Middleton
James M. Shear
Inventor
Geo. W. Dearborn
By Ellis Shear
Att'y

UNITED STATES PATENT OFFICE.

GEORGE W. DEARBORN, OF LYNN, MASSACHUSETTS.

SEAT FOR COUNTERS.

SPECIFICATION forming part of Letters Patent No. 571,651, dated November 17, 1896.

Application filed July 25, 1896. Serial No. 600,545. (No model.)

*To all whom it may concern:*

Be it known that I, GEORGE W. DEARBORN, a citizen of the United States, residing at Lynn, in the county of Essex and State of Massachusetts, have invented certain new and useful Improvements in Seats for Counters, of which the following is a specification, reference being had therein to the accompanying drawings.

My invention relates to improvements in seats designed for use in connection with lunch-counters and the like; and the object of the invention is to provide a seat which when not in use may be shoved in toward the counter so as to be out of the way, but which may be quickly drawn out again to afford a firm and secure seat.

The invention is illustrated in the accompanying drawings, in which—

Figure 1 is a side elevation of the seat and its supporting-standard, the counter being indicated in section. Fig. 2 is a view showing the seat in end elevation when not in use, and Fig. 3 is a detail.

Referring to these figures by letter, it will be seen that the counter is indicated at A, and beneath the edge of this is a standard B, supported from the floor by a rearwarly-extending foot C of any suitable or desired construction. At a suitable height from the floor is a boxing D, secured to the standard in any suitable manner, preferably by screws or bolts $d$, and this boxing has a recess or passage-way to receive the bar E, which supports the seat F. The passage-way is of sufficient size to permit the bar to slide freely therein and is provided with a lip or projection on its rear upper edge, as shown at $d'$. When the seat is drawn out, this projection engages a notch in the upper edge of the bar shown at $e$ and holds the bar securely in position.

The seat F is pivotally connected to the outer end of the bar by means of two plates $f$, secured to the under face of the seat, which plates embrace the bar and are pivotally connected thereto by a pin or bolt $f'$. By this means the seat may be swung into a vertical position and shoved close up to the standard out of the way, as clearly shown by dotted lines in Fig. 1. To prevent the bar from being drawn completely out of the passage-way, a pin $f'''$ is provided in the end of the bar.

It will be noticed that the plates $f$ extend from the center of the seat toward one edge and that the end of the bar is pivoted between these plates close to the edge of the seat. The result of this is that when the seat is folded down to a horizontal position for use the whole width of the seat rests upon and is supported by the bar, thus rendering the seat steadier and relieving the pivot of much of the strain. The plates also embracing the bar for their full length prevent any twisting of the seat.

Having thus described my invention, what I claim is—

1. In combination, the counter, the vertical standard, the boxing, the bar slidable in said boxing, and the seat having the elongated plates secured to the bottom thereof and extending to near one edge, the outer end of the bar being pivoted between the plates near their outer ends and said plates embracing the bar for the full length of the plates when the seat is in a horizontal position, substantially as described.

2. In combination, with a counter, the standard beneath the edge thereof having a rearwardly-extending foot, the boxing bolted to the side of said standard and having a recess or passage-way, the bar slidable in said passage-way and having a notch in its upper edge near the inner end, the lip on the boxing for engaging said notch, the cross-pin in the end of the bar, the seat, and the angle-plates bolted to the under face thereof and embracing the end of the bar, said bar being connected to said plates near the edge of the seat whereby the seat may be swung into either a vertical or horizontal position, and when in a horizontal position will be supported directly by the bar, substantially as described.

In testimony whereof I affix my signature in presence of two witnesses.

GEORGE W. DEARBORN.

Witnesses:
   C. H. WELCH,
   FLORENCE LAZZARO.